United States Patent
Morin et al.

(10) Patent No.: US 9,441,974 B2
(45) Date of Patent: Sep. 13, 2016

(54) SYSTEM AND METHOD FOR CALCULATING LEVER ARM VALUES PHOTOGRAMMETRICALLY

(71) Applicant: NovAtel, Inc., Calgary (CA)

(72) Inventors: Kristian Morin, Calgary (CA); Ryan Dixon, Calgary (CA)

(73) Assignee: NOVATEL INC., Calgary (CA)

( * ) Notice: Subject to any disclaimer, the term of this patent is extended or adjusted under 35 U.S.C. 154(b) by 218 days.

(21) Appl. No.: 13/832,512

(22) Filed: Mar. 15, 2013

(65) Prior Publication Data

US 2014/0267690 A1    Sep. 18, 2014

(51) Int. Cl.
    *G01C 21/16*   (2006.01)
    *G01C 11/00*   (2006.01)
    *G06K 9/46*    (2006.01)

(52) U.S. Cl.
    CPC ............. *G01C 21/165* (2013.01); *G01C 11/00* (2013.01)

(58) Field of Classification Search
    CPC ............... G06K 9/00691; G06K 9/00798; G06K 9/46; G08G 1/167; G01C 21/3602; G01C 11/00; G01C 21/165; G01C 21/28; G01C 17/38; G01C 25/00; G01C 21/12; G01C 15/06; G01C 21/24; G01C 11/02; G01C 15/00; G01S 19/49; G01S 19/52; G01S 1/08; G01S 1/042; G01S 19/10; G01S 19/13; G01S 19/43; G01S 19/46; G06F 15/00; H04B 7/0891; H04B 7/028; H04B 7/086
    See application file for complete search history.

(56) References Cited

U.S. PATENT DOCUMENTS

| | | | |
|---|---|---|---|
| 4,639,878 A | 1/1987 | Day et al. | |
| 5,894,323 A * | 4/1999 | Kain | G01C 11/02 348/116 |
| 6,182,005 B1 | 1/2001 | Pilley et al. | |
| 6,437,823 B1 * | 8/2002 | Zhang | H04N 17/002 348/187 |
| 6,463,444 B1 * | 10/2002 | Jain | G06F 17/30787 |
| 6,594,600 B1 | 7/2003 | Arnoul et al. | |
| 6,754,584 B2 * | 6/2004 | Pinto | G01C 21/165 342/357.48 |
| 7,190,826 B2 * | 3/2007 | Russell | G06T 7/0077 356/602 |
| 7,668,629 B2 * | 2/2010 | DiEsposti | B64G 3/00 342/357.29 |
| 7,805,244 B2 * | 9/2010 | Park | G01C 21/165 244/158.1 |
| 8,564,661 B2 * | 10/2013 | Lipton | G08B 13/19608 348/143 |
| 8,620,772 B2 * | 12/2013 | Owen | H04W 4/001 705/26.62 |

(Continued)

OTHER PUBLICATIONS

Tofel, Kevin C., (hereinafter Tofel), "How to measure anything with a camera and software", Feb. 6, 2007; URL: http://gigaom.com/2OO7102106/how_to_measure_/.*

(Continued)

*Primary Examiner* — Chikaodili E. Anyikire
*Assistant Examiner* — Dramos I Kalapodas
(74) *Attorney, Agent, or Firm* — Cesari and McKenna, LLP (57) ABSTRACT

The inventive technique calculates lever arm values associated with a GNSS/INS system photogrammetrically. A calibrated camera on a device captures a plurality of images of the GNSS/INS system with the inclusion of a target, having known attributes and a plurality of control points. Thereafter, an application, executing on the device determines the lever arm values from the images of the GNSS/INS system utilizing the known attributes and the control points of the target. The INS may utilize the calculated lever arm values to combine information received from a GNSS receiver, of the GNSS/INS system, with information provided by sensors of the INS to compute updated positions, velocities, and/or orientations.

21 Claims, 5 Drawing Sheets

(56) References Cited

U.S. PATENT DOCUMENTS

| | | | | |
|---|---|---|---|---|
| 2001/0055483 | A1* | 12/2001 | Sakai | G01C 15/06 396/89 |
| 2002/0191862 | A1 | 12/2002 | Neumann et al. | |
| 2003/0133594 | A1 | 7/2003 | Sefton | |
| 2008/1447730 | | 6/2008 | Lee et al. | |
| 2008/0284643 | A1* | 11/2008 | Scherzinger | G01C 21/005 342/357.31 |
| 2009/0180667 | A1 | 7/2009 | Mahan et al. | |
| 2009/0262974 | A1* | 10/2009 | Lithopoulos | G06T 7/0042 382/100 |
| 2010/0063664 | A1 | 3/2010 | Anderson | |
| 2010/0066603 | A1* | 3/2010 | O'Keefe | G01C 15/00 342/357.27 |
| 2010/0318294 | A1* | 12/2010 | Rosing et al. | 701/220 |
| 2011/0046915 | A1* | 2/2011 | Hol | G01C 21/165 702/150 |
| 2011/0064312 | A1* | 3/2011 | Janky | G01C 15/00 382/195 |
| 2011/0070840 | A1* | 3/2011 | Nielsen et al. | 455/67.11 |
| 2011/0153198 | A1* | 6/2011 | Kokkas | G01C 21/3638 701/533 |
| 2011/0235923 | A1* | 9/2011 | Weisenburger | G01C 11/00 382/201 |
| 2012/0078510 | A1 | 3/2012 | Ma et al. | |
| 2013/0195362 | A1* | 8/2013 | Janky | G01C 15/00 382/195 |
| 2013/0243250 | A1* | 9/2013 | France | G01C 15/00 382/103 |
| 2014/0072169 | A1 | 3/2014 | Haas et al. | |

OTHER PUBLICATIONS

Fabio Remondino et al., (hereinafter Remondino) "Digital Camera Calibration Methods: Consideerations and Comparisons", IAPRS vol. XXXVI, Part 5, Dresden Sep. 25-27, 2006.*

Roger Y. Tsai, "A Versatile Camera Calibration Technique for High-Accuracy 3D Machine Vision Metrology Using Off-the-Shelf TV Cameras and Lenses", Aug. 1987 © IEEE.*

Zhengyou Zhang "A Flexible New Technique for Camera Calbration", Tech. Report MSR-TR-98-71, Dec. 2, 1998.*

Francisco Vasconcelos (hereinafter Vasconcelos) "A Minimal Solution for the Extrinsic Calibration of a Camera and Laser-Rangefinder", 0162-8828, Nov. 2012 © IEEE.*

Sérgio Santos "Feature Extraction and Matching Methods and Software for UAV Aerial Photogrammetric Imagery", University of Porto, 2013.*

"Contributions to the Use of 3D Lidars for Autonomous Navigation: Calibration and Qualitative Localization" by Naveed Muhammad, Universite de Toulouse, Thesis Feb. 1, 2012.*

"Digital Camera Calibration Methods: Consideration and Comparisons" by Fabio Remondino et al., IPRS vol. XXXVI, Dresden, Sep. 2006.*

"The Performance of a Tight INS/GNSS/Photogrammetric Integration Scheme for Land Based MMS Aplications in GNSS Denied Environments" by Chien-Hsun Chu et al.*

Tofel, Kevin C., "How to measure anything with a camera and software" [online], Feb. 6, 2007 [retrieved on May 25, 2014]. Retrieved from the Internet:,URL: http://gigaom.com/2007/02/06/how_to_measure_/>.

"iPhotoMeasure—Measure anything in a photo" [online] Jan. 13, 2008 [retrieved on May 25, 2014]. Retrieved from the Internet: <URL: https://www.youtube.com/watch?v=XV-TUIR6wDU>.

"iphotomeasure tutorial measurement" [online] Jun. 1, 2007 [retrieved on May 25, 2014], Retrieved from the Internet <URL: https://www.youtube.com/watch?v=ShhxxAEPRjU>.

"Digital Dimensioning with UPHOTOMEASURE" [online] Aug. 20, 2008 [retrieved on May 25, 2014], Retrieved from the Internet: <URL: https://www.youtube.com/watch?v=XV-TUIR6wDU>.

Trew, James "Researchers measure 3D objects using just a camera and projector, can tell if you've ironed your shirt (video)" [online] Aug. 14, 2012 [retrieved on May 25, 2014]. Retrieved from the Internet: <URL: http://www.engadget.com/2012/08/14/researchers-measure-3d-objects-using-just-a-camera-and-projector/>.

International Search Report and Written Opinion mailed Apr. 23, 2014 for International Application No. PCT/CA2014/050035 filed on Jan. 20, 2014 by Novatel Inc., 9 pages.

* cited by examiner

SYSTEM AND METHOD FOR CALCULATING LEVER ARM VALUES PHOTOGRAMMETRICALLY

BACKGROUND OF THE INVENTION

1. Field of the Invention

The invention relates generally to GNSS/INS systems, and more particularly, to a system and method for calculating lever arm values for the GNSS/INS systems.

2. Background Information

Global navigation satellite system (GNSS) and inertial navigation system (INS) integration is nowadays a standard approach for certain navigation and remote sensing applications that utilize position, velocity, and/or orientation information. To compensate for sensor drifts in the INS, the INS may be periodically provided with position and velocity information from an associated GNSS receiver. The INS uses the information from the GNSS receiver to accurately compute updated position, velocity, and/or orientation utilizing information from its sensors.

The INS sensors are integrated into an inertial measurement unit (IMU). The IMU is not typically mounted at the same location as a GNSS antenna that operates with the GNSS receiver. For example, the GNSS antenna is usually mounted on the outside of a vehicle, such as on the roof, for a sky view, while the IMU may be mounted on the inside of the vehicle. Accordingly, the INS and GNSS components of the integrated system have different measurement reference points. The reference point of the GNSS component is the location of the GNSS antenna, and the reference point of the INS component is a selected location with reference to the IMU.

A 3-dimensional vector between the respective reference point of the INS component and the GNSS component is known as a "lever arm," and the lengths of the vector in the x, y, and z dimensions are referred to as "lever arm values." The INS utilizes the lever arm values to combine information received from the GNSS receiver with the information read from the sensors of the INS. Thus, accurate lever arm values are crucial for the integrated GNSS/INS system to accurately compute position, velocity, and/or orientation information.

Currently, users may utilize a theodolite to very precisely derive the lever arm values. However, setting up an associated network to make the necessary measurements may be daunting and also extremely expensive, and thus, prohibitive to many users. A common alternative is for a user to measure the lever arm values using a plumb bob and tape measure. However, utilizing the plumb bob and tape measure is tedious and also highly susceptible to user error. Thus, what is needed is an easy, accurate, and relatively inexpensive technique for calculating the lever arm values.

SUMMARY OF THE INVENTION

The inventive system and method calculates lever arm values associated with a GNSS/INS system photogrammetrically using images taken of the components of the GNSS/INS system and a strategically placed target that has known attributes and a plurality of known control points. Specifically, a calibrated camera on a device (e.g., mobile phone) takes a series of images from different vantage points, in which each image includes at least the GNSS antenna, the IMU, and the target. Thereafter, the lever arm values are calculated for the GNSS/INS system by determining an image scale and the coordinates of the GNSS antenna and the IMU relative to the target in the images. More specifically, the target, GNSS antenna, and the IMU may be automatically recognized from the images based on one or more characteristics of the target (e.g., color(s), shape) and markers on the GNSS antenna and IMU. Using the known attributes of the target (e.g., dimensions and internal arrangement of the target) in conjunction with the control points of the target, that are identifiable points of interest within the target, the scale of the image as well as the relative orientation and placement of the GNSS antenna to the IMU can be determined, to calculate the coordinates of the GNSS antenna and the IMU. Thereafter, the 3-dimensional vector between the reference point of the INS component and the GNSS antenna is calculated from the images based on the coordinates.

The lever arm value calculations may be performed on the device, for example, by an application executed by processors on the device, and then transmitted from the device to the GNSS/INS system.

Alternatively, the device may transmit the images to the GNSS/INS system, and the system calculates the lever arm values from the images. The system then uses the calculated lever arm values, to combine information received from the GNSS receiver with the information provided by the sensors of the INS, and compute updated positions, velocities, and/or orientations.

Alternatively, the device (e.g., mobile phone) may transmit the images to a remote site for processing (e.g., a desktop computer at a home office, or an online service). The remote site may calculate the lever arm values from the images and then transmits the lever arm values back to the device. The device may then transmit the lever arm values to the GNSS/INS system.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
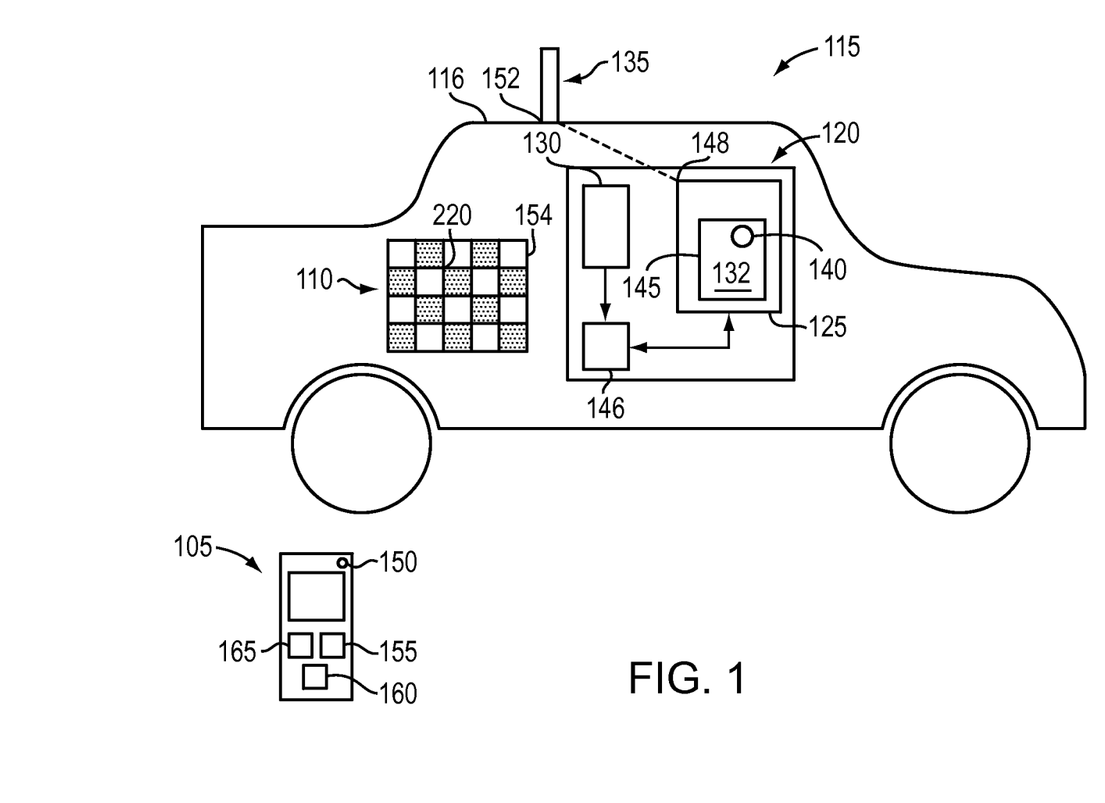
FIG. 1 illustrates a system constructed in accordance with the invention.

FIG. 1 depicts a vehicle 115, with an installed GNSS/INS system 120 that includes an INS component 125, a GNSS receiver 130 and an associated GNSS antenna 135. The INS component 125 includes an inertial measurement unit (IMU) 145 with a body 132 and a plurality of sensors 140. The plurality of sensors 140 provide, to one or more processors 146 of the GNSS/INS system 120, information from which the processors 146 calculate one or more of updated positions, velocities, and/or orientations. A target 110 with known attributes and a plurality of control points 220 is strategically placed within the vehicle 115 relative to the IMU 145.

The IMU 145 positioned inside vehicle 115 and the GNSS antenna 135 positioned on the exterior of the vehicle 115, such as on the roof 116, creates a 3-dimensional level arm vector (depicted as a dotted line) between a predetermined measurement reference point of the INS component 125 (e.g., corner 148 of the INS component 125) and a base 152 of the GNSS antenna 135. In the illustrative embodiment and as shown in FIG. 1, the target 110 is placed in close proximity to the IMU 145 and aligned with an axis of the IMU 145. In the example, an edge 154 of the target 110 is aligned with a selected axis of the IMU 145. Further, the dimensions of the IMU are known or can be determined form the images and the INS reference point, in this example, is at the corner 148 of the IMU 145.

A device 105, which may be a mobile phone, includes a transmitter 165 that has network capabilities to communicate with other devices over a wired or wireless network. Further, device 105 includes a camera 150 and one or more processors 155, which may be configured to execute functions associated with the camera 150 and also execute one or more applications (e.g., mobile apps) that may be stored in a memory 160 of the device 105. The camera 150 is calibrated in a manner known by those skilled in the art.

In one embodiment, the one or more processors 155 execute an application on the device 105 that calculates the lever arm values photogrammetrically using known techniques, based on the images that include the GNSS antenna 135, the IMU 145, and the target 110. The transmitter 165 then transmits the lever arm values to the INS component 125. Alternatively, the device 105 may transmit the images to the GNSS/INS system 120, which then calculates the lever arm values from the images photogrammetrically, using known techniques, based on images that include the GNSS antenna 135, the IMU 145, and the target 110.

Figure 2A:
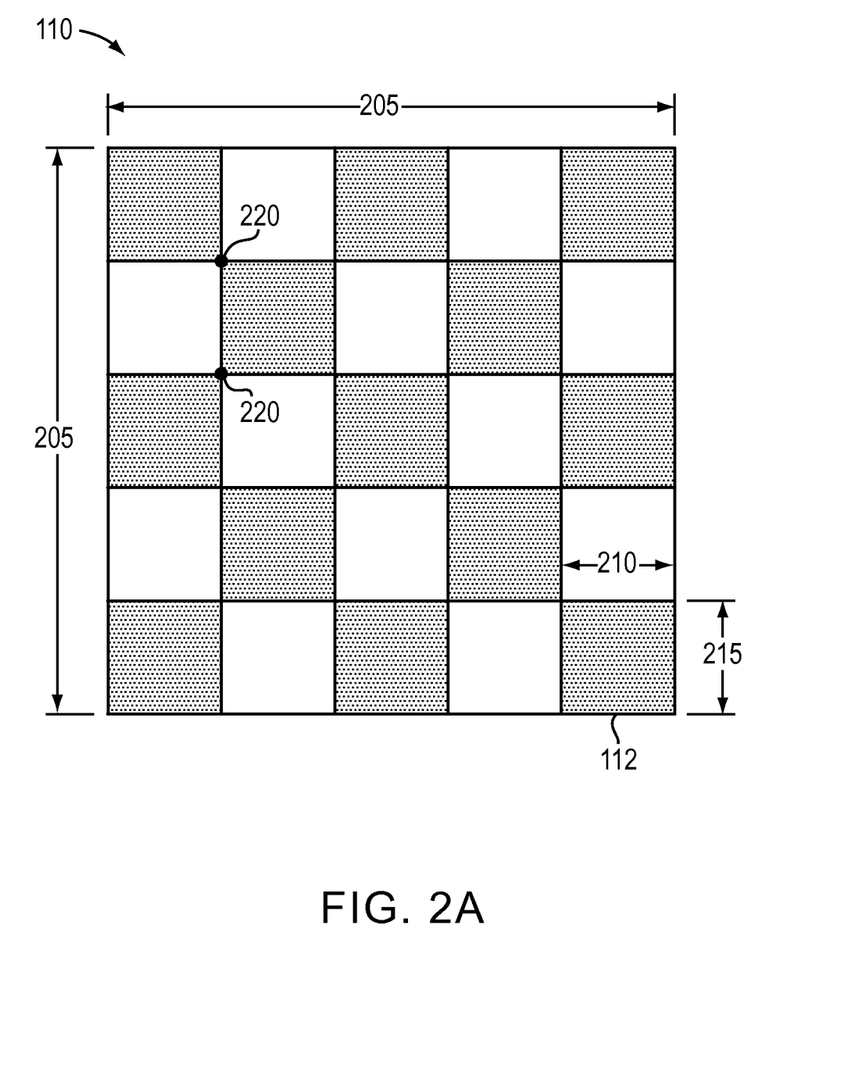
FIGS. 2A and 2B illustrate exemplary targets utilized in the system of FIG. 1.
Figure 2B:
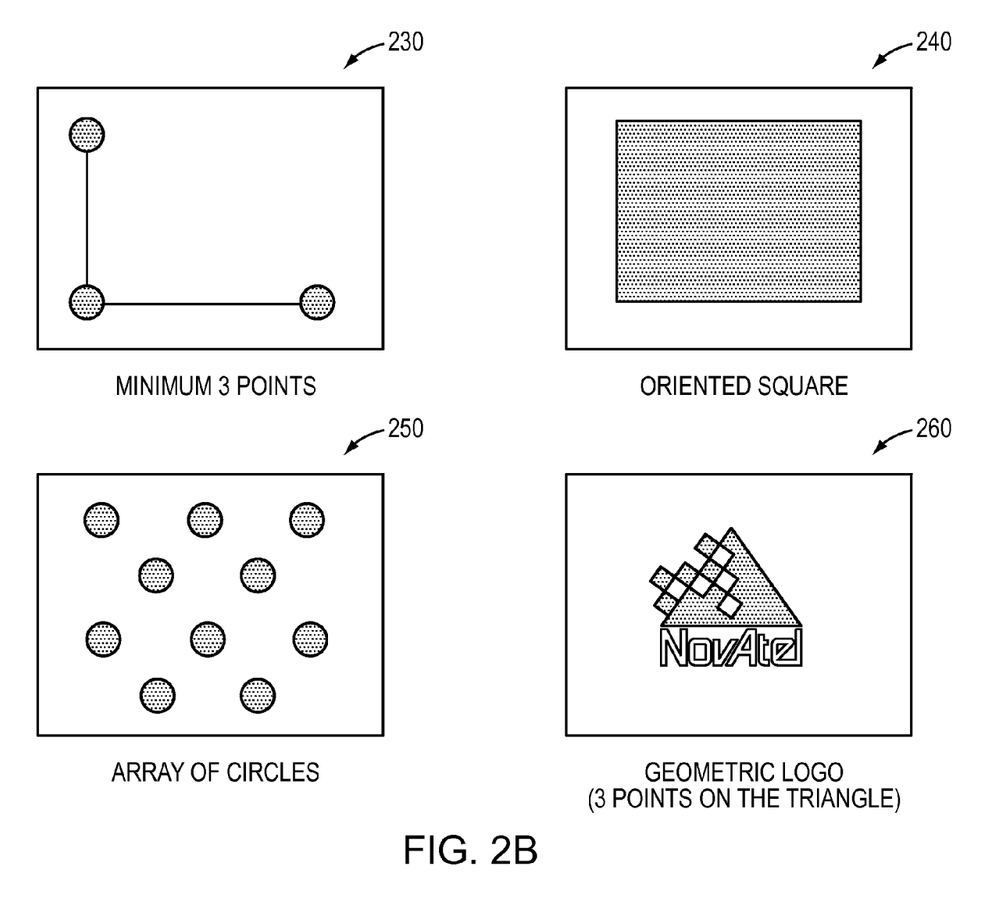

A target may be any pattern having a minimum of three known points which define scale and orientation. FIG. 2A illustrates an example target 110, having known attributes and a plurality of control points 220. As shown in this example, the target 110 may be a checkerboard that is readily recognizable in the captured images based on the pattern and/or color of the target 110. The use of the checkerboard as the target is simply exemplary in nature, and any other target patterns, having the at least three control points, may be used and recognized based on the same or other known characteristics and/or attributes. As illustrated in FIG. 2B, such patterns may be three strategically placed points 230, an orientated square 240, an array of circles 250 having known separations, a geometric logo 260, etc.

In the example, the overall dimensions 205 of the target 110, as well as the width 210 and the length 215 of each square 112 on the checkerboard may be the known attributes. Further, the control points 220 may be the points at which the respective squares intersect other squares on the checkerboard.

The known attributes and the control points 220 of the target 110 allow the system to determine the lever arm values for the GNSS/INS system photogrammetrically using known techniques, based on images that include the GNSS antenna 135, the IMU 145, and the target 110. Specifically, the known attributes allow the system to determine the relative position of each control point 220 on the checkerboard from within an image, which in turn allows the system to determine the lever arm values for the GNSS/INS system 120 from the images, as described below.

Figure 3A:
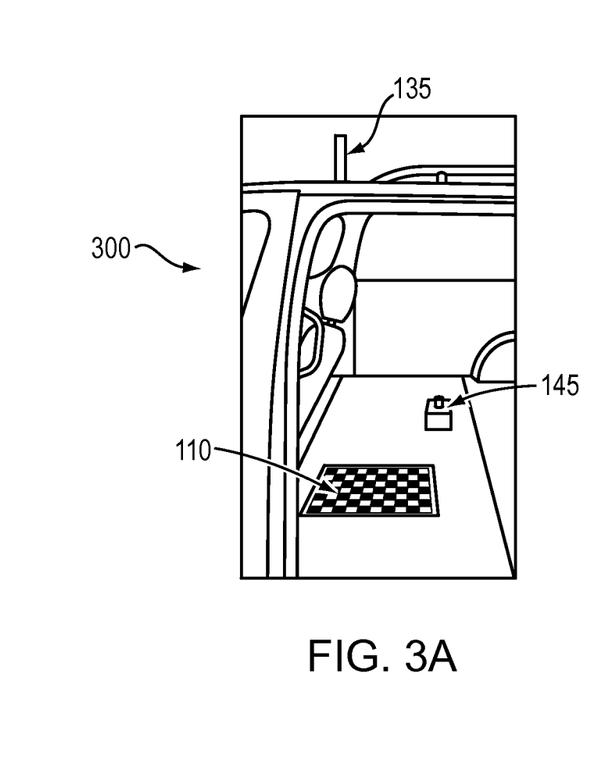
FIGS. 3A and 3B are exemplary images utilized in the system of FIG. 1 to calculate the lever arm values.
Figure 3B:
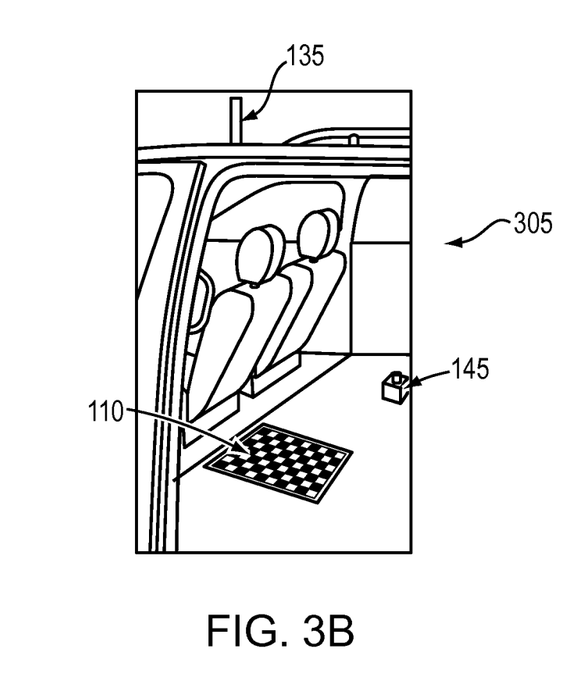

Referring now also to FIGS. 3A and 3B, images 300 and 305 taken by the camera 150 are utilized to determine the lever arm values. Prior to capturing the images 300 and 305, the camera 150 is calibrated. The calibration may be performed in a known manner using, for example, an application such as a mobile application. Alternatively, the camera may be calibrated based on images taken of the checkerboard pattern of the target 110. To do this, the user takes one or more calibrated images that are essentially filled with the checkerboard, and uses known techniques to perform the calibration from the calibrated images.

Once the camera 150 is calibrated, the lever arm values may be calculated photogrammetrically from images that include the GNSS antenna 135, the IMU 145, and the target 110. To calculate the lever arm values, at least two images from different vantage points of the GNSS/INS system 120 are needed. It is noted that increasing the number of images of the GNSS/INS system 120 from various vantage points will allow the system to calculate more reliable lever arm values.

In the example, the device 105 executes an application to determine the lever arm values associated with the GNSS/INSS system 120 from the images 300 and 305. As a first step, the target 110 is recognized and located in the images. If, for example, the target 110 is a checkerboard, the target 110 may be recognized and located based on color(s), the pattern, or other known characteristics of the checkerboard.

The IMU 145 and the GNSS antenna 135 are also located in the images. To do this, a user of the system may place markers on the GNSS antenna 135 and the IMU 145 in the images, utilizing a graphical user interface of the application executing on the device 105, by appropriately touching the screen of the device 105. The markers allow the system to recognize the GNSS antenna 135 and the IMU 145 within the images 300 and 305. In alternative embodiments, a user may physically place stickers, or other markers, on the GNSS antenna 125 and the IMU 130, prior to capturing the images. Thereafter, the application executing on device 105 may automatically recognize the GNSS antenna 135 and IMU 145 within the images 300 and 305 based on the markers. In yet another alternative, the GNSS antenna 135 and/or the IMU 145 may be painted in readily identifiable colors and/or have distinct recognizable shapes and so forth, such that the two are readily recognized within the image by the application.

Once the target 110, GNSS antenna 135, and IMU 145 are recognized within each image, the known attributes and the control points of the target 110 can be utilized to determine the lever arm values associated with the GNSS/INS system 120 from the images that include the GNSS antenna 135, the IMU 145, and the target 110. As previously mentioned, in this example the known attributes may be the size of the checkerboard and the dimensions of each square on the checkerboard. Further, each of the plurality of control points may be the points at which the respective squares intersect other squares on the checkerboard. Although reference is made to a checkerboard, any target having at least three control points which define scale and orientation may be used.

The known attributes of the target allow the system to determine a scale and a relative orientation for each image based on distances between the respective control points within the image. Thus, using the known attributes of the target in conjunction with the plurality of control points, the orientation of the GNSS antenna 135 relative to the target 110 (e.g., coordinate along the z-axis) and the orientation of the IMU 145 relative to target 110 (e.g., coordinate along the z-axis) can be determined using known photogrammetric techniques from the at least two images, each including the GNSS antenna 135, the IMU 145, and the target 110, that are taken by the calibrated camera 150 from different vantage points. For example, the system may determine that the GNSS antenna 135 is "in front" of (e.g., positive coordinate along the z-axis) or "behind" (e.g., negative coordinate along the z-axis) the target 110 in each image, and/or that the IMU 145 is in front of or behind the target 110.

Moreover, the known attributes and the control points of the target 110 are used to obtain a scale for each image that is then utilized to determine the x and y, and z coordinates of the GNSS antenna 135 relative to the target 110 and the reference point of the INS component 125 (e.g., the corner 148 of the IMU 145) relative to the target 110. For example, a particular control point of the target may serve as an origin of coordinate aces, to determine the relative x, y, and z coordinates of the GNSS antenna 135 and the corner 148 of the IMU 145. The x, y, and z coordinates of the GNSS antenna 135 and the corner 148 of the IMU 145 relative to the target 110 may then be used to determine the lever arm values of the lever arm vector between the corner 148 of the IMU 145 and the GNSS antenna 135. It is noted that using greater number of images from different vantage points allows the system to produce more reliable lever arm values.

Thereafter, in one embodiment, the determined lever arm values may be sent to the INS component 125 to compensate for drifting in sensors 140. For example, the lever arm values may be sent from the device 105 to the INS component 125 using a wireless network or over a wired cable connection (not shown). The INS component 125 then utilizes the lever arm values, determined from the images, to combine information received from the GNSS receiver with the information provided by the sensors of the INS, and computes updated positions, velocities, and/or orientations.

Figure 4:
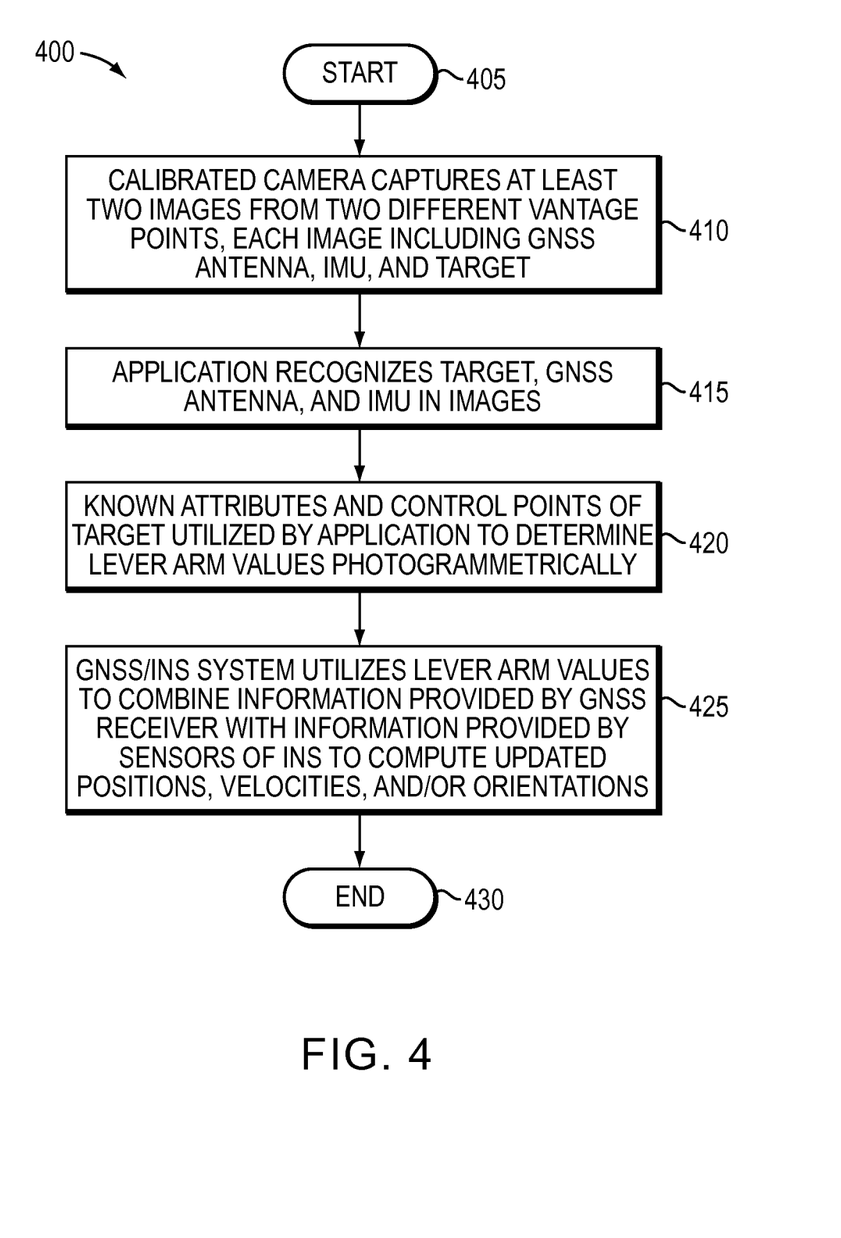
FIG. 4 is a flow chart for the operation of the system of FIG. 1.

Referring now also to FIG. 4, the operations performed by the application executed by, for example, processor 155 of the device 105 to derive the lever arm values are discussed. The procedure 400 starts at step 405 and continues to step 410, where the previously calibrated camera 150 captures at least two images that are from two different vantage points and include the GNSS antenna 135, the IMU 145, and the target 110, which have known attributes and control points 220.

At step 415, the application recognizes the target, the GNSS antenna, and the IMU in the images. For example, the application recognizes characteristics (e.g., color and/or pattern) of the target and locates the target within the images. Further, markers may be utilized to recognize and locate the GNSS antenna and the IMU from within the images. Specifically, a user may utilize a graphical user interface to manually place the markers on the GNSS antenna and the IMU within the images by touching the screen when a given image is displayed. Alternatively, the user may physically place on the GNSS antenna and the IMU "flags" or other markers that allow the application to automatically recognize the GNSS antenna and the IMU within the image.

At step 420, the known attributes of the target (e.g., dimensions of the target and dimensions of the squares) and the control points of the target (e.g., intersecting points of the squares) are utilized by the application to determine the lever arm values photogrammetrically. Specifically, the known attributes of the target in conjunction with the control points of the target may be used to determine, for a given image, the scale of the image as well as the relative orientation of the GNSS antenna to the reference point of the INS (e.g., corner of the IMU). A particular control point of the target may then serve as an origin of coordinate axes, and x, y, and z coordinates of the GNSS antenna and the reference point of the INS relative to the target may be determined. Thereafter, the 3-dimensional vector between the reference point of the INS and the base of the GNSS antenna is then calculated from the images based on the relative coordinates.

At step 425, the GNSS/INS system utilizes the lever arm values to combine information provided by the GNSS receiver with the information provided by the sensors of the INS to compute updated positions, velocities, and/or orientations. The procedure then ends at step 430.

Advantageously, the present invention can calculate the lever arm values to within an approximate error of 2 cm relative to values measured using a costly and cumbersome theodolite. That is, the present invention provides a cost effective technique for calculating accurate and reliable lever arm values photogrammetrically. Further, a user may advantageously utilize a camera of an everyday mobile phone, while in the field where the GNSS/INS system operates, to quickly and easily calculate accurate and reliable the lever arm values for the GNSS/INS system.

The foregoing description has been directed to specific embodiments. It will be apparent, however, that other variations and modifications may be made to the described embodiments, with the attainment of some or all of their advantages. For instance, it is expressly contemplated that the IMU, which has known or readily measurable dimensions, may serve as the target. Further, it is expressly contemplated that more than one target, each having known or readily measurable dimensions, may be utilized in each image to determine the lever arm values from the images.

What is claimed is:

1. A system, comprising:
   a calibrated camera configured to capture a plurality of images of a global navigation satellite system (GNSS)/inertial navigation system (INS) system, wherein each image includes a GNSS antenna of the GNSS/INS system, a reference point of the INS of the GNSS/INS system, and a target having known attributes and a plurality of control points; and
   one or more processors configured to execute an application that provides instructions to determine lever arm values associated with the GNSS/INS system photogrammetrically based on the plurality of images of the GNSS/INS system and the known attributes and the plurality of control points of the target in the images.

2. The system of claim 1, wherein each image of the plurality of images is from a different vantage point of the GNSS/INS system.

3. The system of claim 1, the application is further configured to:
   determine orientation information associated with each image of the GNSS/INS system utilizing the known attributes and the plurality of control points of the target;
   determine a scale associated with each image utilizing the known attributes and the plurality of control points of the target, wherein the scale associated with each image is applied to each image;
   determine x, y, and z coordinates of the GNSS antenna relative to the target and the reference point of the INS relative to the target utilizing the orientation information and the scale; and
   determine the lever arm values based on the x, y, and z coordinates of the GNSS antenna and the reference point of the INS.

4. The system of claim 1, wherein the lever arm values are associated with a 3-dimensional vector between the reference point of the INS and the GNSS antenna.

5. The system of claim 1, wherein the instructions to determine the lever arm values include instructions to determine the lever arm values when the GNSS antenna is located on a roof of a vehicle and the INS is located inside the vehicle.

6. The system of claim 1, wherein the target is a pattern having at least three control points that define scale and orientation.

7. The system of claim 6, wherein the target is a checkerboard and the known attributes of the target are a size of the checkerboard and dimensions of each square on the checkerboard, and wherein the plurality of control points are points at which respective squares of the checkerboard intersect other squares on the checkerboard.

8. The system of claim 1, wherein the processor is further configured to:
transmit, over a network, the lever arm values to the GNSS/INS system, wherein the GNSS/INS system utilizes the lever arm values to combine information received from a GNSS receiver of the GNSS/INS system with the information provided by sensors of the INS to compute at least one of updated positions, updated velocities, and updated orientations.

9. The system of claim 1, wherein the reference point of the INS and the GNSS antenna are each marked with a marker.

10. A method, comprising:
receiving a plurality of images, captured by a calibrated camera, of a global navigation satellite system (GNSS)/inertial navigation system (INS) system, wherein each image includes a GNSS antenna of the GNSS/INS system, a reference point of the INS of the GNSS/INS system, and a target having known attributes and a plurality of control points; and
calculating, by a processor, the lever arm associated with the GNSS/INS system photogrammetrically based on the plurality of images of the GNSS/INS system and the known attributes and the plurality of control points of the target in the images.

11. The method of claim 10, wherein each of the plurality of images is from a different vantage point of the GNSS/INS system.

12. The method of claim 10, further comprising:
determining orientation information associated with each image of the GNSS/INS system utilizing the known attributes and the plurality of control points of the target;
determining a scale associated with each image utilizing the known attributes and the plurality of control points of the target, wherein the scale for each image is applied to each image;
determining x, y, and z coordinates of the GNSS antenna relative to the target and the reference point of the INS relative to the target utilizing the orientation information and the scale; and
determining the lever arm values based on the x, y, and z coordinates of the GNN antenna and the reference point of the INS.

13. The method of claim 10, wherein the lever arm values are associated with a 3-dimensional vector between the reference point of the INS and the GNSS antenna.

14. The method of claim 10, wherein the GNSS antenna is located on a roof of a vehicle and the INS is located inside the vehicle.

15. The method of claim 10, wherein the target is a pattern having at least three control points that define scale and orientation.

16. The method of claim 15, wherein the target is a checkerboard and the known attributes of the target are a size of the target and dimensions of each square on the checkerboard, and wherein the plurality of control points are points at which respective squares of the checkerboard intersect other squares on the checkerboard.

17. The method of claim 10, further comprising:
transmitting, over a network, the lever arm values to the GNSS/INS system, wherein the GNSS/INS system utilizes the lever arm values to combine information received from a GNSS receiver of the GNSS/INS system with the information provided by sensors of the INS to compute at least one of updated positions, updated velocities, and updated orientations.

18. The method of claim 10, further comprising:
utilizing a graphical user interface to mark, from within an application, the reference point of the INS and the GNSS antenna with an indicator; and
recognizing, by the application, the reference point of the INS and the GNSS antenna based on the indicators.

19. The method of claim 10, further comprising:
recognizing, by an application, the reference point of the INS and the GNSS antenna based on a marker physically placed on the reference point of the INS and the GNSS antenna.

20. The method of claim 10, wherein the INS is the target having the known attributes and the plurality of control points.

21. A system, comprising:
a calibrated camera configured to capture a plurality of images of a global navigation satellite system (GNSS)/inertial navigation system (INS) system, wherein each image includes a GNSS antenna of the GNSS/INS system, a reference point of the INS of the GNSS/INS system, and a target having known attributes and a plurality of control points; and
one or more processors configured to:
determine orientation information associated with each image of the GNSS/INS system utilizing the known attributes and the plurality of control points of the target,
determine a scale associated with each image utilizing the known attributes and the plurality of control points of the target, wherein the scale associated with each image is applied to each image, and
determine a 3-dimensional vector between the reference point of the INS and the GNSS antenna based on the x, y, and z coordinates of the GNSS antenna and the reference point of the INS.

* * * * *

UNITED STATES PATENT AND TRADEMARK OFFICE
CERTIFICATE OF CORRECTION

PATENT NO.         : 9,441,974 B2                                    Page 1 of 1
APPLICATION NO.    : 13/832512
DATED              : September 13, 2016
INVENTOR(S)        : Morin et al.

It is certified that error appears in the above-identified patent and that said Letters Patent is hereby corrected as shown below:

In the Claims

Claim 10, Column 7, Line 36 should read:
calculating, by a processor, the lever arm values associated with Signed and Sealed this
Twenty-fifth Day of April, 2017

Michelle K. Lee
*Director of the United States Patent and Trademark Office*